US008688779B2

(12) United States Patent
Bocking et al.

(10) Patent No.: US 8,688,779 B2
(45) Date of Patent: Apr. 1, 2014

(54) PUBLISHING LOCATION FOR A LIMITED TIME

(75) Inventors: Andrew D. Bocking, Waterloo (CA); Theban Ganeshalingam, Mississauga (CA); Herbert A. Little, Waterloo (CA); Michael S. Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 304 days.

(21) Appl. No.: 12/420,391

(22) Filed: Apr. 8, 2009

(65) Prior Publication Data

US 2010/0262915 A1    Oct. 14, 2010

(51) Int. Cl.
*G06F 15/16*    (2006.01)

(52) U.S. Cl.
USPC ........... 709/204; 709/202; 709/212; 709/216; 709/218; 709/228; 709/237; 709/248; 709/252

(58) Field of Classification Search
USPC ......... 709/201, 205, 212, 218, 227, 237, 248, 709/252, 202, 216, 228
See application file for complete search history.

(56) References Cited

U.S. PATENT DOCUMENTS

| | | | | |
|---|---|---|---|---|
| 5,602,903 | A * | 2/1997 | LeBlanc et al. | 455/456.2 |
| 6,169,902 | B1 * | 1/2001 | Kawamoto | 455/456.4 |
| 6,351,221 | B1 * | 2/2002 | Phillips et al. | 340/8.1 |
| 6,553,236 | B1 * | 4/2003 | Dunko et al. | 455/456.1 |
| 6,850,987 | B1 * | 2/2005 | McCanne et al. | 709/238 |
| 6,920,328 | B2 * | 7/2005 | Wollrab | 455/456.1 |
| 6,993,325 | B1 * | 1/2006 | Waesterlid | 455/414.1 |
| 6,996,084 | B2 * | 2/2006 | Troxel et al. | 370/338 |
| 7,215,966 | B2 * | 5/2007 | Joshi | 455/456.1 |
| 7,248,230 | B2 * | 7/2007 | Piccionelli | 345/2.1 |
| 7,277,049 | B2 * | 10/2007 | Korneluk et al. | 342/357.42 |
| 7,353,034 | B2 * | 4/2008 | Haney | 455/457 |
| 7,363,357 | B2 * | 4/2008 | Parupudi et al. | 709/220 |
| 7,444,137 | B1 * | 10/2008 | McNamara et al. | 370/338 |
| 7,472,202 | B2 * | 12/2008 | Parupudi et al. | 709/246 |
| 7,483,944 | B2 * | 1/2009 | Parupudi et al. | 709/203 |
| 7,499,951 | B2 * | 3/2009 | Mueller et al. | 715/762 |

(Continued)

FOREIGN PATENT DOCUMENTS

WO    WO 2009/016505 A2    2/2009

OTHER PUBLICATIONS

Sarah Perez; Brightkite Wants to Win the Mobile Social Network Battle; ReadWriteWeb; Apr. 28, 2008; pp. 1 to 3 of 7; http://www.readwriteweb.com/archives/brightkite_wants_to_win_the_mobile_social_network_battle.php.

(Continued)

*Primary Examiner* — Michael Y Won

(57) ABSTRACT

A method and user device for limiting a time for which location data sharing is enabled for a user device of a data sharing group, the data sharing group comprising at least two user devices inclusive of the user device, each user device of the data sharing group configured to store data shared by user devices of the data sharing group on the respective user device and to maintain a list of the user devices in the data sharing group. The method comprises receiving an instruction through a user interface on the user device indicating that location data sharing is to be enabled for a limited time period after which location sharing is to be disabled, obtaining location data for the user device during the limited time period; and sending the location data to at least one other user device of the sharing group during the limited time period.

20 Claims, 13 Drawing Sheets

(56) References Cited

U.S. PATENT DOCUMENTS

| | | | | |
|---|---|---|---|---|
| 7,536,458 | B2* | 5/2009 | Teodosiu et al. | 709/225 |
| 7,570,927 | B2* | 8/2009 | Correal et al. | 455/90.1 |
| 7,595,754 | B2* | 9/2009 | Mehta | 342/450 |
| 7,617,328 | B2* | 11/2009 | Lewis et al. | 709/246 |
| 7,636,365 | B2* | 12/2009 | Chang et al. | 370/401 |
| 7,689,682 | B1* | 3/2010 | Eldering et al. | 709/223 |
| 7,693,734 | B2* | 4/2010 | Christenson et al. | 705/7.19 |
| 7,716,286 | B2* | 5/2010 | Heins et al. | 709/204 |
| 7,729,708 | B2* | 6/2010 | Jung et al. | 455/456.3 |
| 7,822,860 | B2* | 10/2010 | Brown et al. | 709/228 |
| 7,823,073 | B2* | 10/2010 | Holmes et al. | 715/753 |
| 7,860,019 | B2* | 12/2010 | Zhang et al. | 370/252 |
| 7,945,675 | B2* | 5/2011 | Skomra | 709/227 |
| 7,992,037 | B2* | 8/2011 | Dubnicki et al. | 714/6.2 |
| 8,000,726 | B2* | 8/2011 | Altman et al. | 455/456.3 |
| 8,010,601 | B2* | 8/2011 | Jennings et al. | 709/204 |
| 8,064,894 | B1* | 11/2011 | Bill | 455/418 |
| 8,073,461 | B2* | 12/2011 | Altman et al. | 455/456.1 |
| 8,073,908 | B2* | 12/2011 | Heins et al. | 709/204 |
| 8,078,729 | B2* | 12/2011 | Kozat et al. | 709/226 |
| 8,108,501 | B2* | 1/2012 | Birnie et al. | 709/223 |
| 2002/0035605 | A1* | 3/2002 | McDowell et al. | 709/206 |
| 2002/0120703 | A1* | 8/2002 | Kaufman et al. | 709/207 |
| 2003/0236890 | A1* | 12/2003 | Hurwitz et al. | 709/227 |
| 2006/0223518 | A1 | 10/2006 | Haney | |
| 2008/0070593 | A1* | 3/2008 | Altman et al. | 455/457 |
| 2008/0104227 | A1* | 5/2008 | Birnie et al. | 709/224 |
| 2008/0114829 | A1* | 5/2008 | Button et al. | 709/203 |
| 2010/0077017 | A1* | 3/2010 | Martinez et al. | 709/201 |
| 2010/0325194 | A1* | 12/2010 | Williamson et al. | 709/203 |

OTHER PUBLICATIONS

David Chartier; Hands on with Brightkite: real-world social networking; Arts Technica; May 4, 2008; pp. 1 to 4 of 4; http://arstechnica.com/old/content/2008/05/hands-on-with-brightkite-real-world-social-networking.ars.

Privacy & Security; Loopt Inc.; printed on Feb. 23, 2009; pp. 1 to 3 of 3; http://www.loopt.com/about/privacy-security.

Calley Nye; Mobissimo Launches Travel Social Network MobiFriends; Jul. 15, 2008; pp. 1 to 3 of 7; http://www.techcrunch.com/2008/07/15/mobissimo-launches-travel-social-network-mobifriends/.

The best way to organize and share your travel plans; TripIt, Inc.; printed on Feb. 23, 2009; p. 1 of 1; http://www.tripit.com/.

Privacy Policy; TripIt, Inc.; May 29, 2008; pp. 1 to 3 of 3; http://www.tripit.com/uhp/privacyPolicy.

About Dopplr; Dopplr; printed on Feb. 23, 2009; p. 1 of 1; http://www.dopplr.com/main/about.

Lisa Sounio; How to Use Twitter and Dopplr together; Feb. 23, 2009; pp. 1 to 3 of 3; http://blog.dopplr.com/2009/02/23/how-to-use-twitter-and-dooplr-together/.

What is Whrrl?; printed on Feb. 23, 2008; pp. 1 to 2 of 2; http://faq.whrrl.com/.

Privacy; printed on Feb. 23, 2008; pp. 1 to 2 of 2; http://faq.whrrl.com/?page_id=203.

Mark Hendrickson; Whrrl: Map and Mobile-Centric Social Reviews; Nov. 2, 2007; pp. 1 to 4 of 13; http://www.techcrunch.com/2007/11/02/whrrl-map-and-mobile-centric-social-reviews/.

Alcatel-Lucent OmniTouch My Teamwork; Alcatel-Lucent; printed on Feb. 23, 2009; pp. 1 to 2 of 2; http://www.alcatel-lucent.com/wps/portal/products/detail?LMSG_CABINET=Solution_Product_Catalog&LMSG_CONTENT_FILE=Products/Product_Detail_000224.xml&_requestid=9546.

Multimedia Communication Server 5100; Nortel; printed on Feb. 23, 2009; p. 1 of 1 http://www.products.nortel.com/go/product_content.jsp?segId=0&parID=0[]_id=52080.

Cisco 2710 Wireless Location Appliance AIR-LOC2710-L-K9; Macmall; printed on Feb. 23, 2009; pp. 1 to 2 of 2; http://www.macmall.com/macmall/shop/detail.asp?Redir=1&description=Cisco%2D2710 . . . .

Extended European Search Report dated Nov. 4, 2009 from corresponding European Patent Application No. 09157669.4, 5 pages.

Statement in accordance with the Notice from the European Patent Office dated Oct. 1, 2007 concerning business methods (OJ EPO Nov. 2007, 592-593) [XP002456252].

\* cited by examiner

PUBLISHING LOCATION FOR A LIMITED TIME

TECHNICAL FIELD

The present application relates to a user device and method for limiting a time for which location data sharing is enabled for a user device of a data sharing group.

BACKGROUND

Data sharing group applications are used on user devices in networks to share information between members of one or more groups. For example, some such applications allow users to create static groups. Within each group, data, such as location, images, calendar information, or the like can be shared with other members of the group.

In some applications, the data shared amongst group members may include location data. For example, if location sharing is enabled by a user for a particular group of which the user is a member, other members of that group can access the location data of the user. In some applications, each member of the group can view the locations of each group member who has enabled location sharing on a map displayed on a respective user interface.

The location data that is shared in some of these applications is obtained from a GPS receiver in the respective user device.

For privacy reasons or for other reasons, a user may not wish to share location information with other group members at all times. As a result, there is a desire for a method of allowing the user to choose exactly when to share location information.

BRIEF DESCRIPTION OF THE DRAWINGS

Examples of embodiments will now be described in greater detail with reference to the accompanying drawings, in which.

DETAILED DESCRIPTION

A data sharing group allows members of the group to share data with other members of the group. Users can create different groups of trusted members for different purposes, for example: school friends; family; co-workers; golf foursome; small business; book club; and hockey team, among others. Some data sharing groups are managed with the use of a server, through which the data to be shared is sent. The data in some data sharing group applications is stored on a server and accessed from the server by the group members.

Data sharing can also be accomplished, in some embodiments, with a peer-to-peer data sharing group. In peer-to-peer data sharing groups, data to be shared is sent from one user device to at least one other user device in the peer-to-peer group and stored on the at least one other user device. Each device of a peer-to-peer data sharing group has a copy of all the data shared with and received by that member of the group. The peer-to-peer data sharing group is entirely controlled on the user devices as well.

Figure 1:
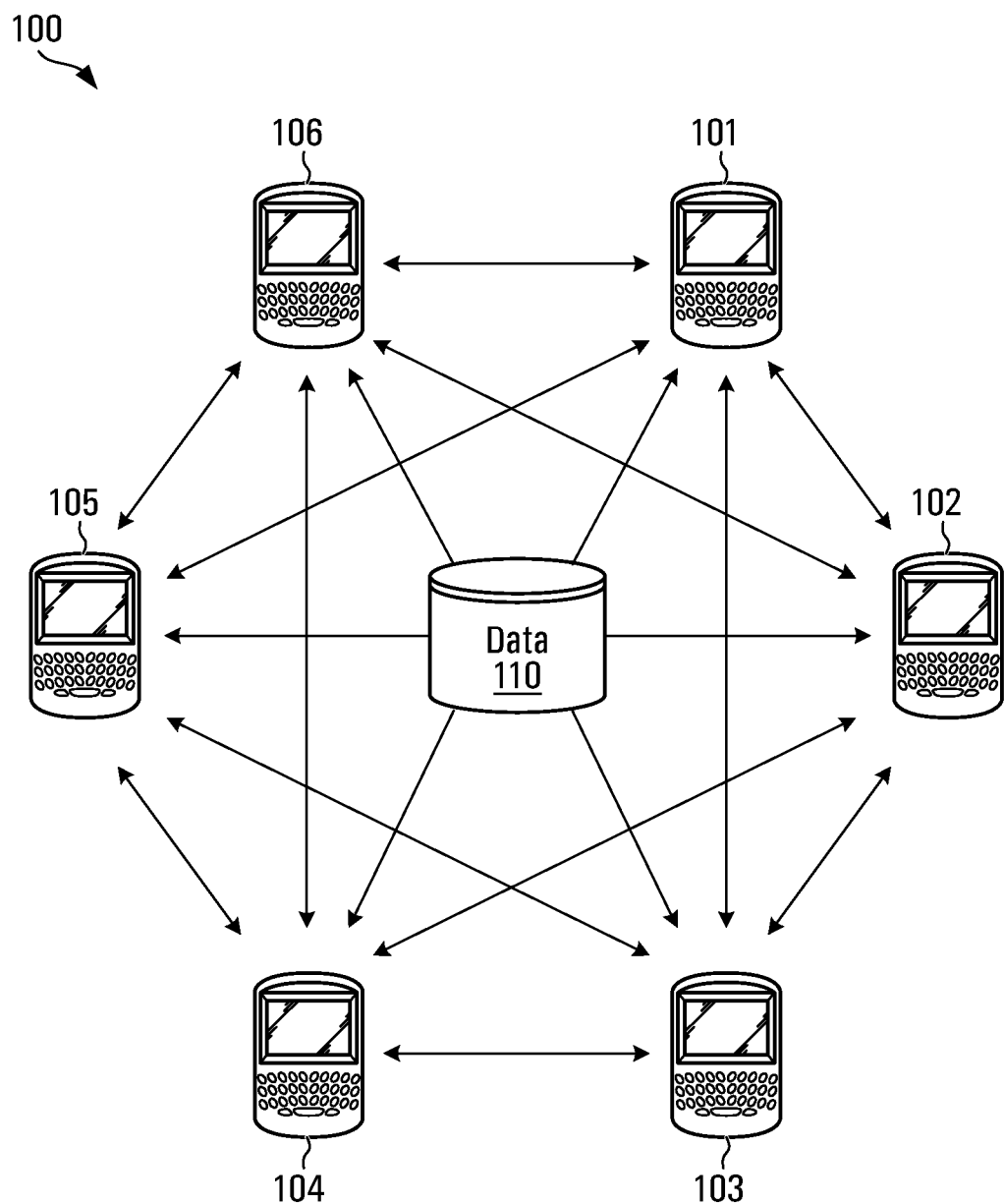
FIG. 1 is a schematic diagram of an exemplary peer-to-peer data sharing group.

An exemplary embodiment of a peer-to-peer data sharing group will now be described with reference to FIG. 1. FIG. 1 shows a peer-to-peer data sharing group 100, comprising six members 101, 102, 103, 104, 105, and 106. Of course, the peer-to-peer group can comprise any number of members and six are shown in this example for illustrative purposes only. Each member 101, 102, 103, 104, 105, and 106 of the group 100 can communicate with all of the other members 101, 102, 103, 104, 105, and 106. In some embodiments private communications can also take place between selected members of the group. Data 110 represents data shared by all of the group members, a copy of which is stored on each group member's device. In some embodiments, Data 110 may only be shared by selected members of the group, in which case it is only stored on the selected members' devices. Group members send messages between one another in order to share Data 110, as described in more detail below.

To communicate data to multiple users, in an embodiment of the peer-to-peer data sharing group 100, traffic from any one member is directed through at least a relay or router having the ability to direct the traffic to the respective members of the group 100. In some embodiments, each group member has an associated address such as a Personal Identification Number (PIN) or an IP address. In some embodiments, the relay or router has the ability to accept from a sending group member a single message containing the addresses of multiple receiving group members, and to redistribute the message independently to each of the multiple receiving group members. In some embodiments, the relay or router subsequently provides the sending group member with a delivery acknowledgement when each of the receiving group members receives the message. As a result, despite having sent only a single message to the relay or router, the sending group member is able to track the delivery of the message to each of the receiving group members independently.

In peer-to-peer data sharing groups, members can use any user device capable of communicating with the other members for sharing the data. Non-limiting examples include mobile electronic devices, mobile telephones, laptop computers, personal computers, personal digital assistants, among others.

Non-limiting examples of data that can be shared are location data, images, lists, contact information, calendar information, among others. Examples of location data that can be shared are a location entered by a member, a location selected by a member, a location obtained from a location determination system on a user device, a location calculated based on data available from a position broadcast system, such as GPS, GLONAS or systems based on triangulation of signals from antennae.

Shared location data can be displayed on user interfaces as text information, image data, such as a map, a video stream or any other suitable interface or can be output to a user as an audio stream. It is to be understood that any suitable output can be used.

Figure 2A:
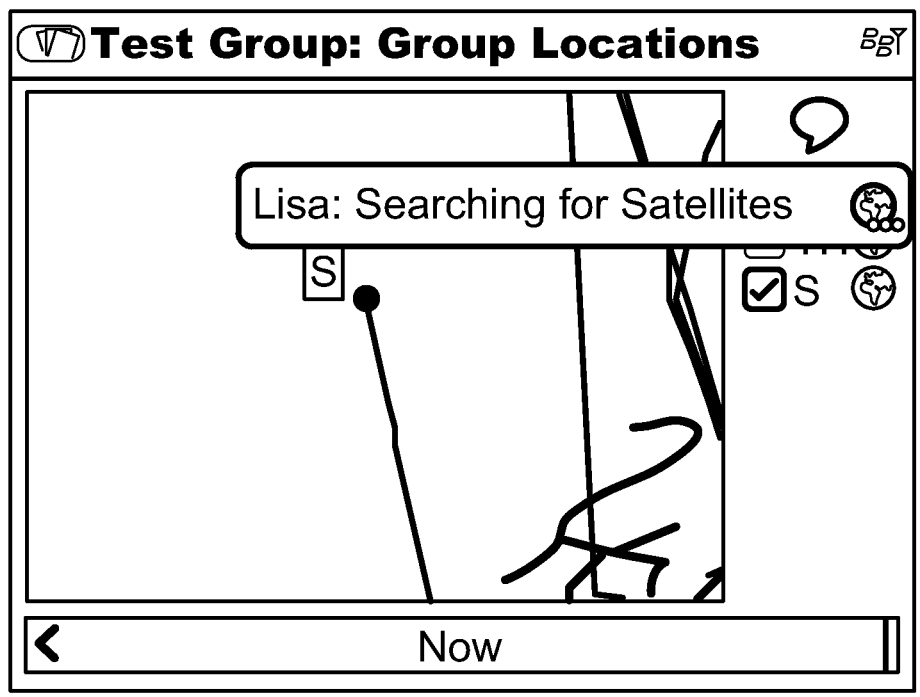
FIGS. 2A to 2F are screen shots of a user interface according to an embodiment.
Figure 2B:
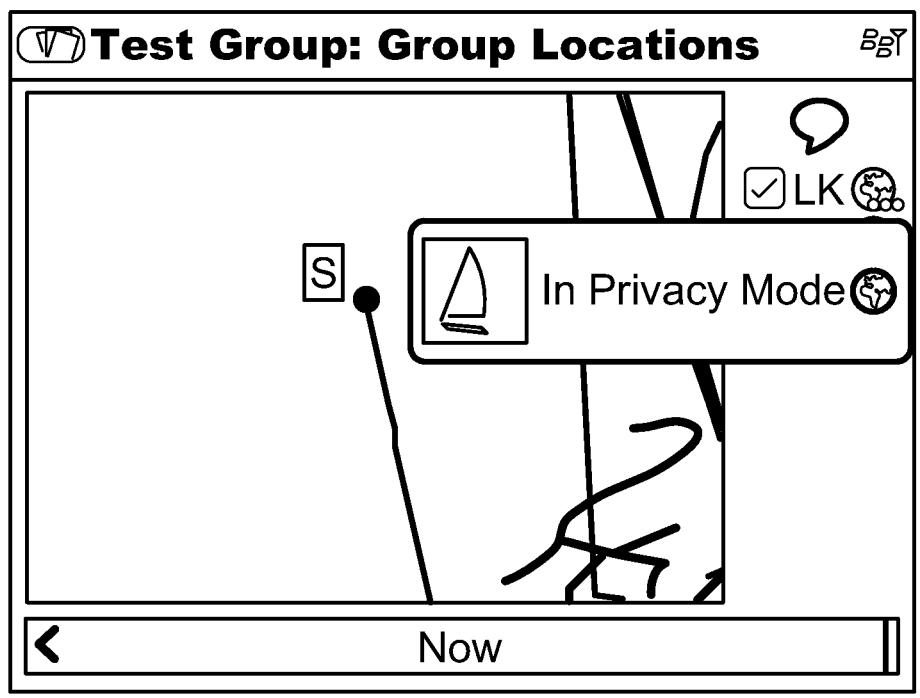
Figure 2C:
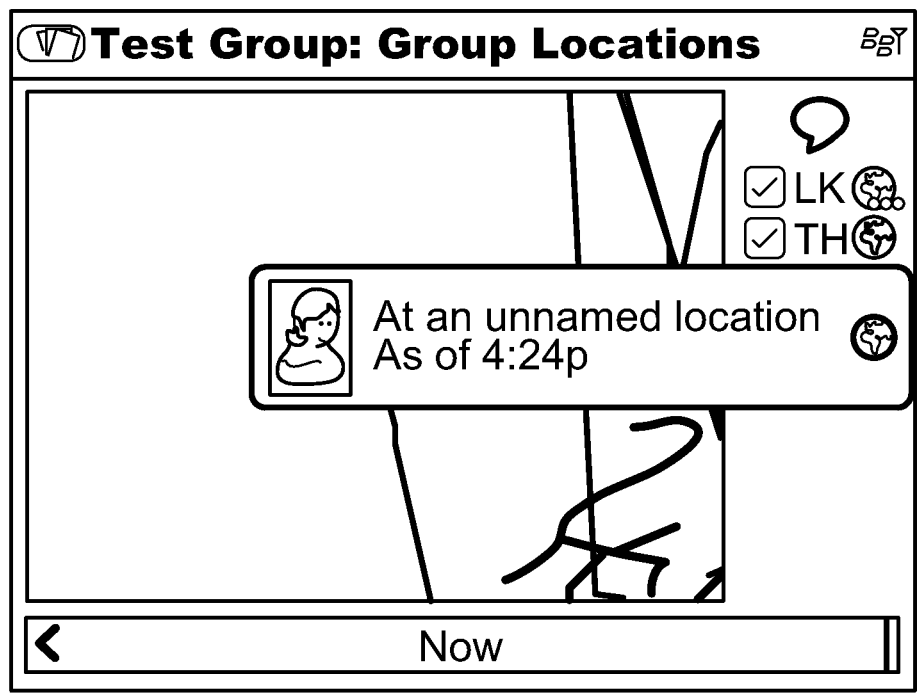
Figure 2D:
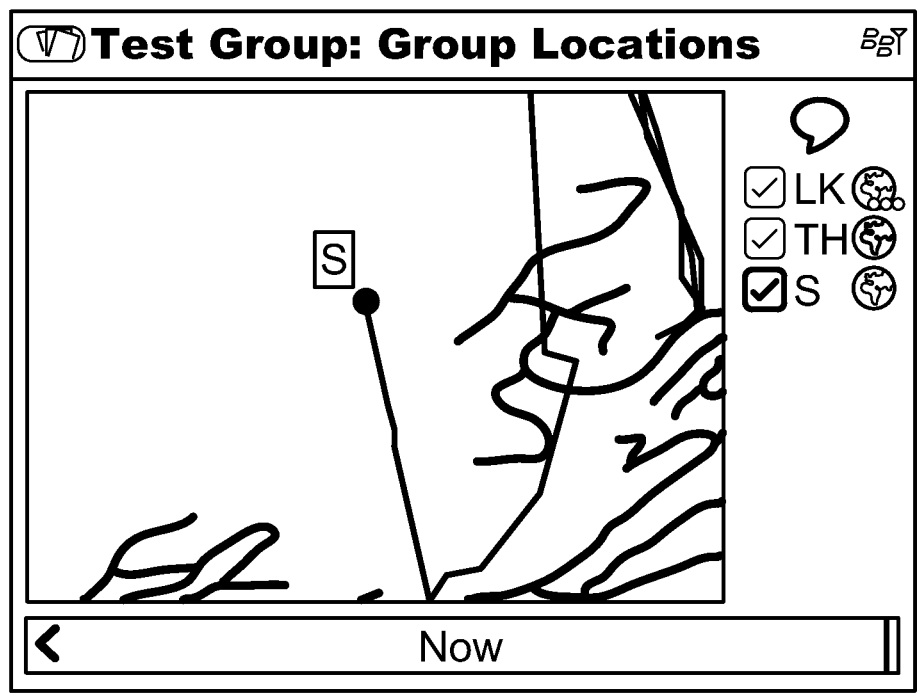
Figure 2E:
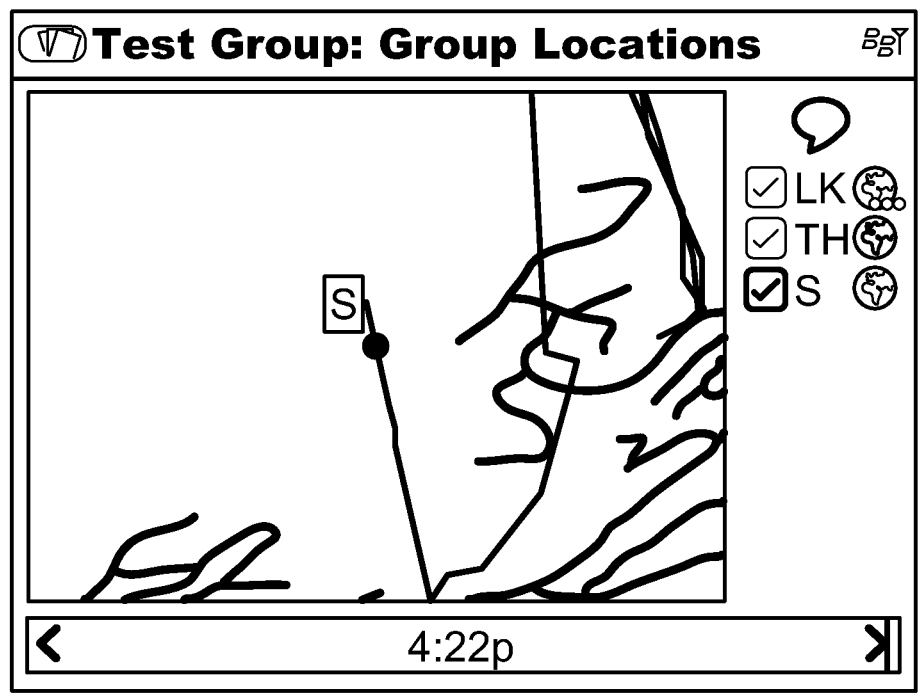
Figure 2F:
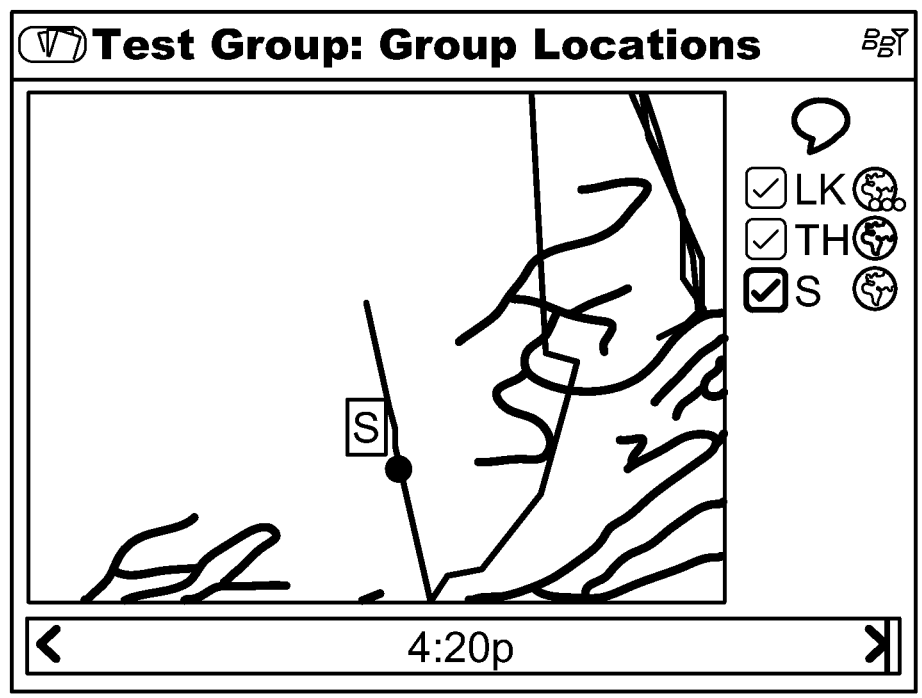

Shared location data can be used to present locations of one or more members of a peer-to-peer group on a map. The location data can also be used to track location history of group members or location status of group members. Non-limiting examples of how the shared location data can be used to display status of group members are shown in the screen shots of FIGS. 2A to 2C. In FIG. 2A, a user, Lisa, is identified as searching for satellites. In FIG. 2B, a group member is identified as being in privacy mode, i.e. this member is not sharing location data. In FIG. 2C, a group member is identified as sharing his or her location and the location is displayed on the user interface. FIGS. 2D to 2F, demonstrate an example of presenting a history of a group member's location. FIG. 2D shows the present location and FIGS. 2E and 2F show the member's location at two other times.

Sharing location data can raise privacy concerns with members of a peer-to-peer data sharing group. A member may only want the other members to be able to find them at certain times or for limited time periods. Members may also be concerned that they will forget to deactivate location sharing once it is enabled. In such a situation, other group members may be able to obtain that member's location data when the member may not desire the location data to be available.

In addition, if location sharing is enabled for extended periods of time, a GPS receiver may be in use for the entire time, which consumes a significant amount of power.

Setting a time limit for how long location sharing is enabled can alleviate a member's concern of forgetting to deactivate the location sharing. As well, if location data to be shared is obtained from a GPS receiver, for example, providing a member with an option to set a time limit during which location sharing is enabled can conserve power consumption in a user device used by the member, for example if the GPS receiver is turned off or not required to continually provide location data.

Thus, in one aspect, there is provided a user device comprising: an output interface for transmitting data to at least one other user device of a data sharing group, the data sharing group comprising at least two user devices inclusive of the user device, each user device of the data sharing group configured to store data shared by user devices of the data sharing group on the respective user device and to maintain a list of the user devices in the data sharing group; a user interface, configured to receive an instruction to enable location data sharing for a limited time period after which location sharing is to be disabled; and a location sharing module configured to, during the limited time period, provide location data for the user device to the output interface to be transmitted to the at least one other user device of the data sharing group.

In another aspect, there is provided a method for limiting a time for which location data sharing is enabled for a user device of a data sharing group, the data sharing group comprising at least two user devices inclusive of the user device, each user device of the data sharing group configured to store data shared by user devices of the data sharing group on the respective user device and to maintain a list of the user devices in the data sharing group, the method comprising: receiving an instruction through a user interface on the user device indicating that location data sharing is to be enabled for a limited time period after which location sharing is to be disabled; obtaining location data for the user device during the limited time period; and transmitting the location data to at least one other user device of the sharing group during the limited time period.

In another aspect, there is provided a computer readable medium having computer executable instructions stored thereon, that when executed cause a processor to implement a method for limiting a time for which location data sharing for a user device of a data sharing group is enabled, the data sharing group comprising at least two user devices inclusive of the user device, each user device of the data sharing group configured to store data shared by user devices of the data sharing group on the respective user device and to maintain a list of the user devices in the data sharing group, and the method comprising: receiving an instruction indicating that location data sharing is to be enabled for a limited time period after which location sharing is to be disabled; obtaining location data for the user device; and instructing an output to transmit the location data to at least one other user device of the data sharing group during the time limited period.

Figure 3:
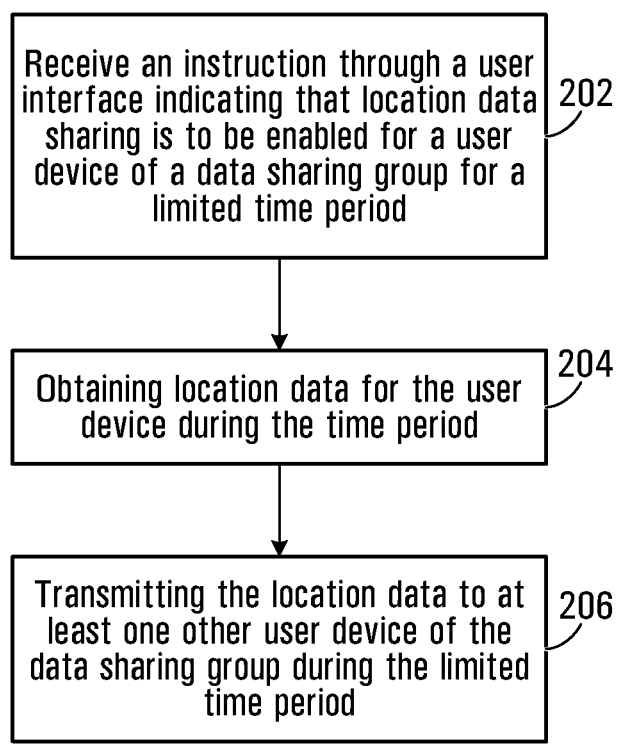
FIG. 3 is a flowchart of a method for limiting a time for which location data sharing is enabled.

Referring now to FIG. 3, a method for limiting a time for which location data sharing is enabled for a user device in a data sharing group will be described. In this embodiment, the data sharing group comprises at least two user devices, each user device of the data sharing group configured to store data shared by user devices of the data sharing group on the respective user device and to maintain a list of the user devices in the data sharing group. In some embodiments, the data sharing group is a peer-to-peer data sharing group.

The method comprises at step 202, receiving an instruction through a user interface on the user device indicating that location data sharing is to be enabled for a limited time period, after which location sharing is to be disabled. Next, at step 204 location data for the user device is obtained during the limited time period. Finally, at step 206, the location data is transmitted to at least one other user device in the data sharing group during the limited time period. In some embodiments, the location data is obtained periodically during the time period. Likewise, the location data, in some embodiments, is sent on a periodic basis to the at least one other user device. In some embodiments, the data is sent to the at least one other user device through a relay.

In an embodiment, receiving location data for the user device comprises obtaining a current location from GPS data for the user device. Other embodiments include, but are not limited to, obtaining a location selected by a user, obtaining a location from a location determination system on a user device, receiving location data calculated based on data available from a position broadcast system, such as GPS, GLONAS or systems based on triangulation of signals from antennae.

In an embodiment, the method further comprises deactivating location data sharing after the limited time period expires. Another exemplary embodiment comprises turning off a location determination system, such as a GPS receiver on the user device, after the limited time period expires. In some embodiments, a notification is created indicating that the location data sharing has been deactivated after the limited time period expires. In yet another embodiment, the device may resume following a pre-established schedule of times during which to share or not share location data, as described below.

Figure 4A:
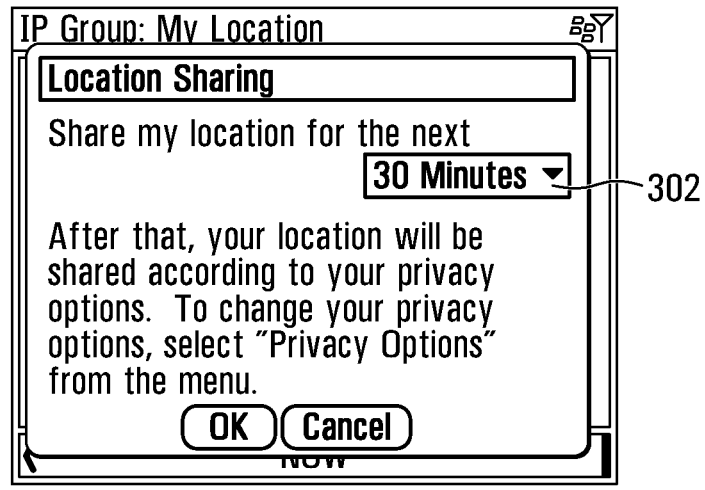
FIGS. 4A to 4D are screen shots of a user interface according to an embodiment.
Figure 4B:
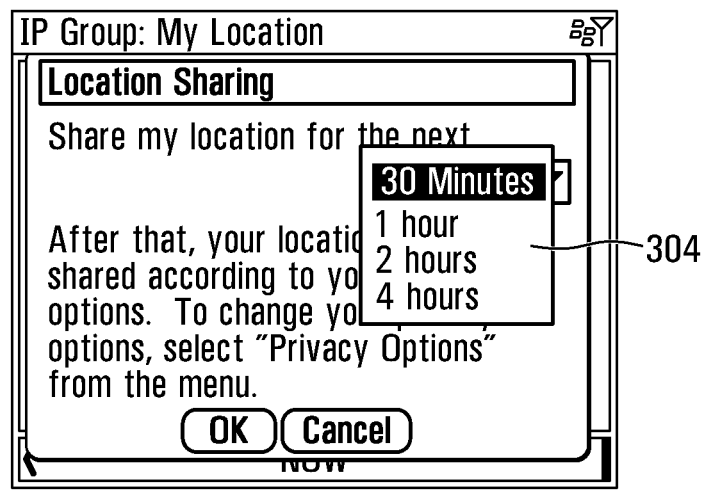

The instruction received through the user interface can be received in any format that permits the user to enter or select the limited time period. In one exemplary embodiment, the method further comprises presenting options on the user interface for selecting time periods for the limited time period. For example, if the user interface is a display screen, a window such as that shown in FIG. 4A can be presented on a display of a user device, once the user has selected an option to share his or her location. In FIG. 4A, a pull down menu 302 is presented from which the user can select how long location sharing is to be enabled. Selecting the pull down menu, in this particular example, presents a list of predefined time periods, as shown in the screen shot in FIG. 4B, where the list 304 comprises the choices of 30 minutes, 1 hour, 2 hours, and 4 hours. Of course, this example is for illustrative purposes only and in other embodiments, other time periods may be presented in the list. As well, the list may be presented in any manner. For example, a new window can be opened. In other embodiments, a window is presented on the user interface in which a time period can be entered manually. In still further embodiments, the option to manually enter a time period is given together with the list of predefined time periods.

Figure 4C:
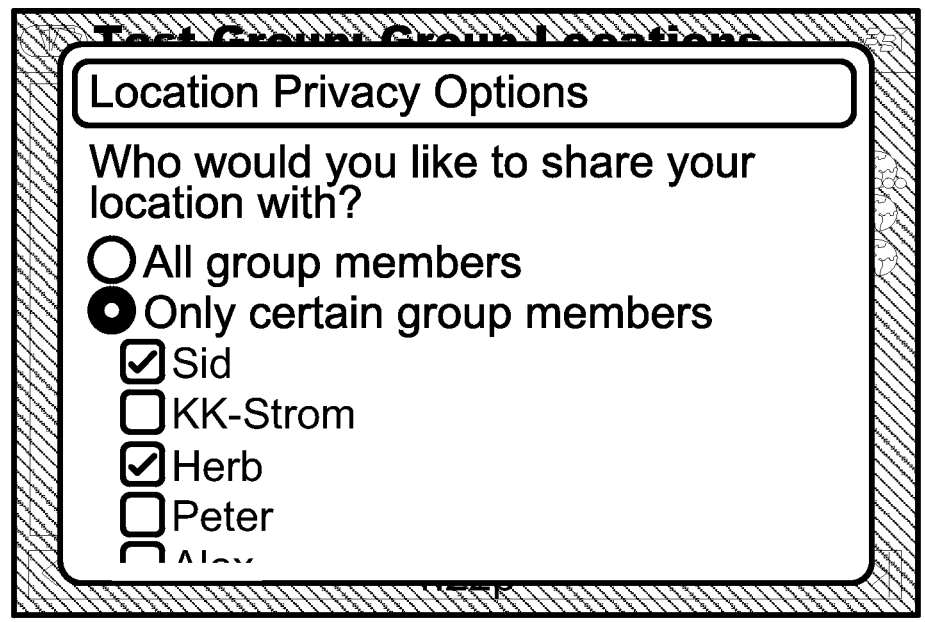
Figure 4D:
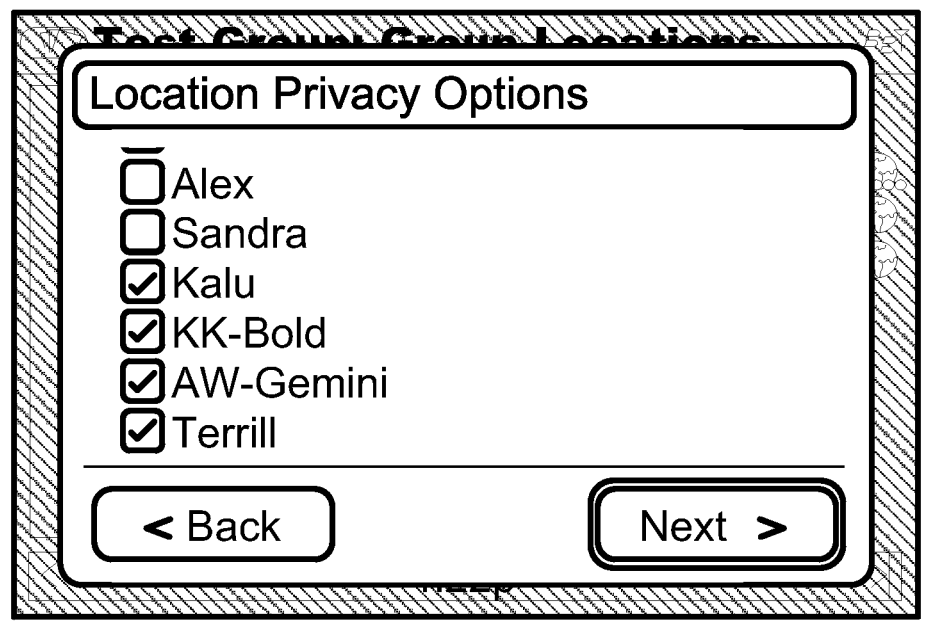

In some embodiments, an option can be presented to share a user device's location with all members of a peer-to-peer group or with selected members. An example of a user interface presenting such an option is shown in FIGS. 4C and 4D.

Figure 5A:
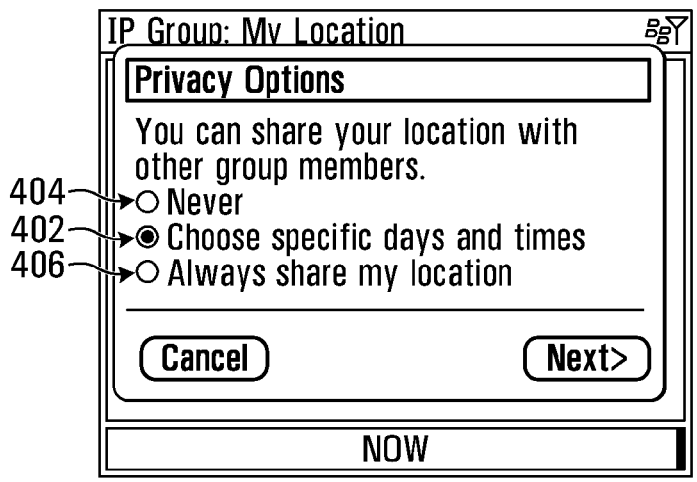
FIGS. 5A to 5C are screen shots of a user interface according to an embodiment.
Figure 5B:
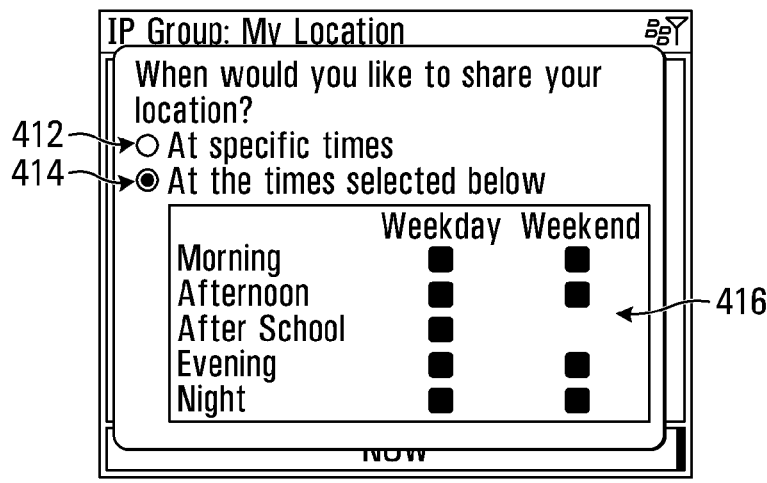
Figure 5C:
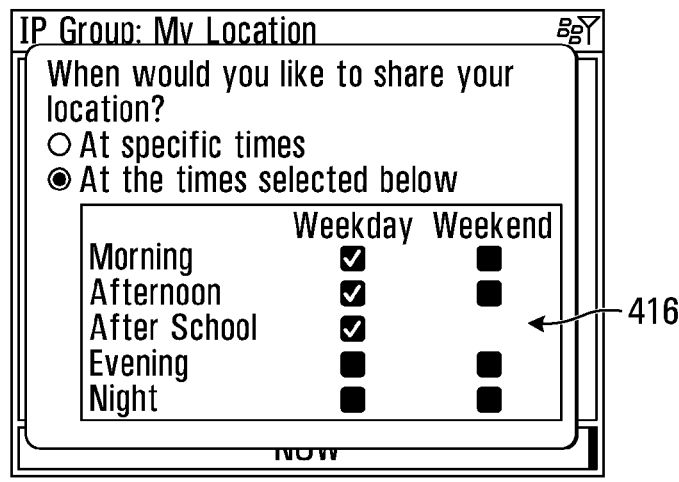

In a still further embodiment, the method comprises presenting an option to select specific days and times for which to enable location sharing. These days and times can be selected for a single iteration in some embodiments or on a recurring basis in other embodiments. Exemplary implementations of this embodiment are shown in the screen shots depicted in FIGS. 5A to 5C and FIGS. 6A to 6E. In FIG. 5A, the user of the device in the data sharing group has been presented with and has selected the option 402 to choose specific days and times to share his or her location with other members of the group. For illustrative purposes only, this screen shot also shows two other options: never share my location 404 and always share my location 406. Any number or combination of options can be presented in other embodiments and implementations. In the implementation shown in FIGS. 5A to 5C, once the user selects to choose specific days and times, the display changes to a new window shown in FIG. 5B, which presents two more options: to share his or her location at specific times 412 or at the times selected below 414, where a list of time periods 416 is listed. In this particular example, the user has chosen to select the time periods from the list 416. FIG. 5C shows a screen shot of the list 416 where the member has selected to share location on weekday mornings, afternoon and after school.

Figure 6A:
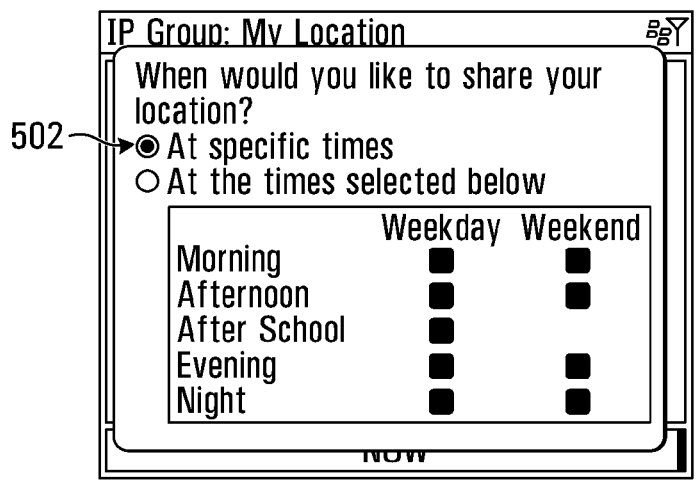
FIGS. 6A to 6E are screen shots of a user interface according to an embodiment.
Figure 6B:
Figure 6C:
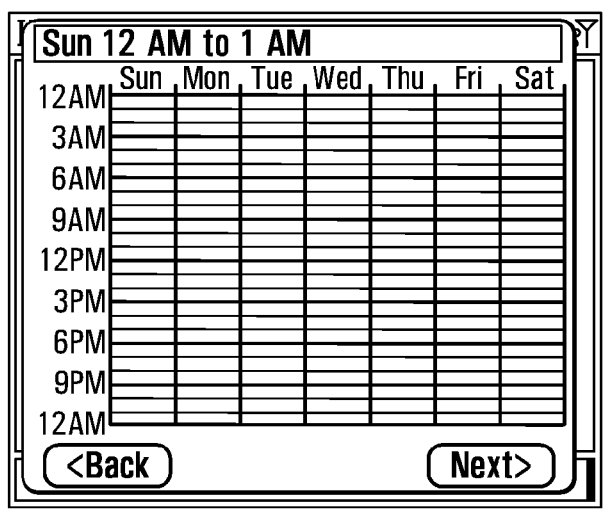
Figure 6D:
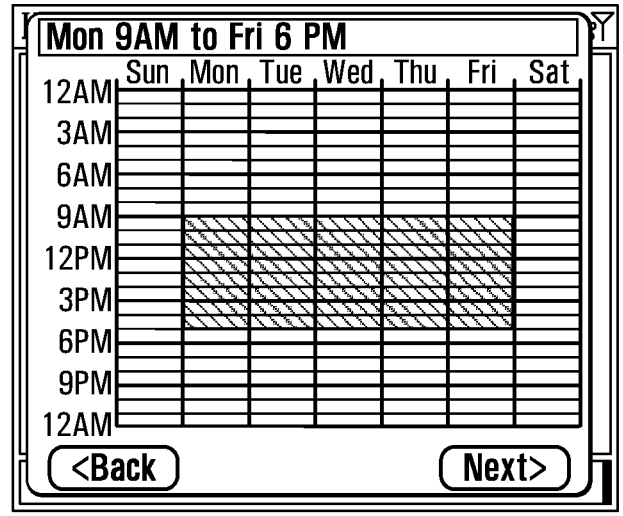
Figure 6E:
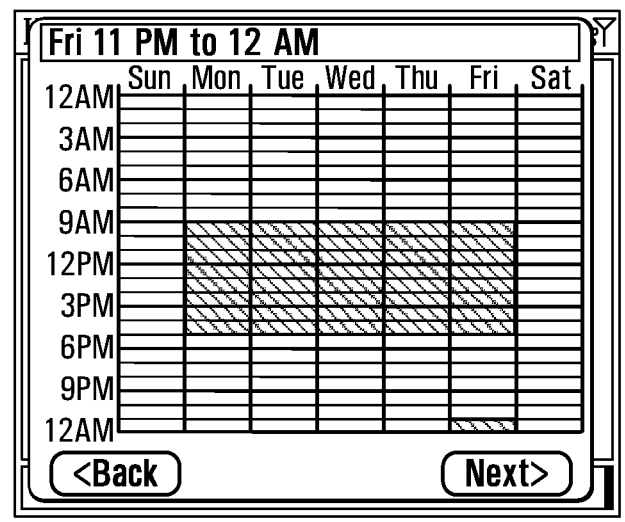

FIGS. 6A to 6E illustrate an exemplary implementation, whereby the user can select specific times to share his or her location. FIG. 6A depicts the same window as in FIG. 5B. However, in this screen shot, the user has chosen the share his or her location at specific times 502. This selection results in the next screen, shown in FIG. 6B, which gives instructions on how to choose times from a calendar that is presented on the following screen which is shown in FIG. 6C. FIGS. 6D and 6E show an example of what the screen looks like when the user highlights and selects time periods. Of course, FIGS. 6A to 6E show one specific implementation and other embodiments, configurations and implementations are possible.

The methods described herein can be implemented by software, hardware, firmware or any combinations thereof or by any other suitable structure.

Figure 7:
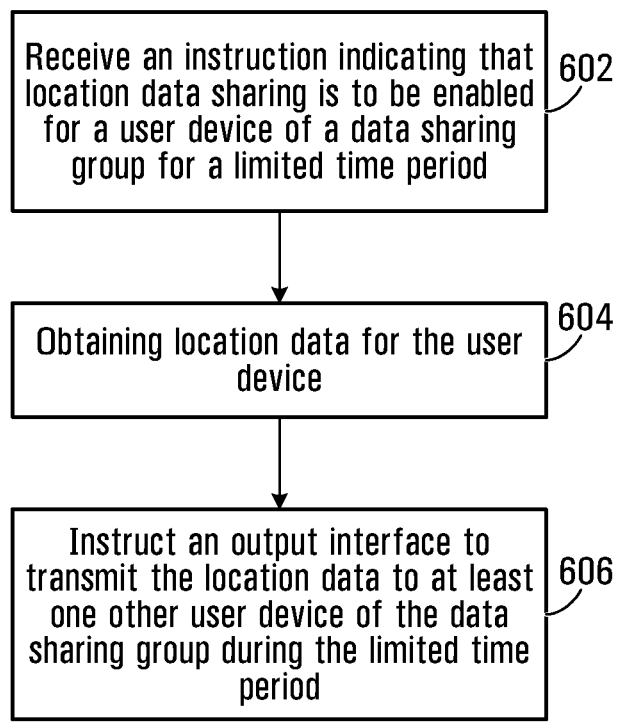
FIG. 7 is a flowchart of a method for limiting a time for which location data sharing is enabled.

In another aspect, a computer readable medium having computer executable instructions stored thereon, that when executed cause a processor to implement a method for limiting a time for which location data sharing for a user device of a data sharing group is enabled is provided. The data sharing group comprises at least two user devices, each user device of the data sharing group configured to store data shared by user devices of the data sharing group on the respective user device and to maintain a list of the user devices in the data sharing group. The method implemented comprises the steps shown in the flowchart of FIG. 7.

The method implemented starts at step 602 with receiving an instruction indicating that location data sharing is to be enabled for a limited time period. At step 604, location data for the user device is obtained. At step 606, an output interface is instructed to transmit the location data to at least one other user device of the data sharing group during the time limited period.

Instructing the output interface to transmit the location data can comprise instructing the output interface to transmit the location data to selected members of the data sharing group, in some embodiments. For example, the user may only want to share location with certain members of the group. The method can be configured to present an option to select the members with which the user's location should be shared. The selected other members are the only members with which location data will then be shared.

Different embodiments of the computer readable instructions can implement any of the methods described herein.

In one embodiment of the computer readable medium, the location data for the member is obtained from GPS (Global Positioning System) data. GPS data can be obtained, for example, from a GPS chipset or GPS receiver in a user device, such as a mobile electronic device.

Figure 8A:
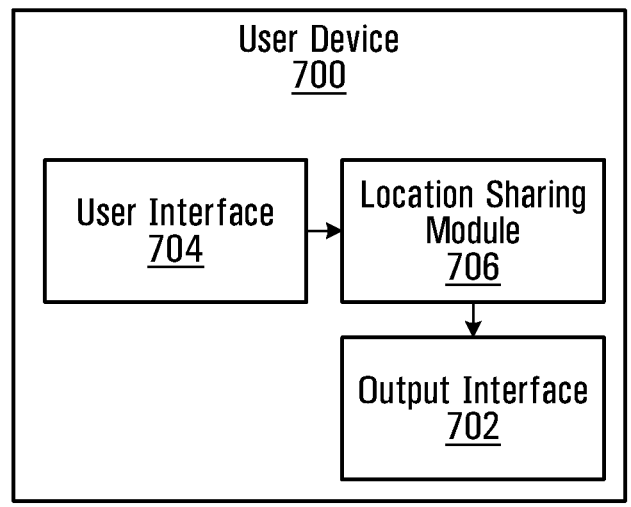
FIG. 8A is a block diagram of elements of a user device.

Referring now to FIG. 8A, a user device 700 will now be described. The user device 700 comprises an output interface 702, a user interface 704 and a location sharing module 706. The user device, in some embodiments, is a mobile device, such as a mobile telephone, a laptop computer or a personal digital assistant. In other embodiments, the user device is a personal computer.

The output interface 702 is for transmitting data to at least one other user device of a data sharing group, the data sharing group comprising at least two user devices, each user device of the data sharing group configured to store data shared by user devices of the data sharing group on the respective user device and to maintain a list of the user devices in the data sharing group. In a mobile device, the output interface 702 may be a transmitter. Alternatively, the output may be a port which may be connectable to a communication system, such as a telephone network or a cable network or a wireless network.

The user interface 704 is for receiving an instruction to enable location data sharing for a limited time period, after which location sharing is to be disabled. Examples of user interfaces include, but are not limited to, a display screen on an electronic device, a keyboard, a touch screen, or a voice enabled input system. It is to be understood that the user interface 704, in some embodiments, is not exclusively for receiving an instruction to enable location data sharing. The user interface 704 can be used by other applications operating on the user device. In user devices 700 where the user interface 704 is a touch display screen, the instruction can, for example, be received using screens or windows, such as those shown in FIGS. 5A to 5C and 6A to 6E.

The location sharing module 706 is configured to, during the limited time period, provide location data for the user device to the output 702 to be transmitted to the at least one other user device. The location sharing module 706, in some embodiments, can implement any of the methods described herein. Furthermore, the location sharing module 706 can be implemented using software, hardware, firmware or combinations thereof.

The limited time period during which the location module 704 provides location data to the output 706 can be in any of the forms discussed herein. For example, the limited time period, in some embodiments, commences upon receipt of the instruction. In other embodiments, the limited time period comprises a recurring time period. In still further embodiments, the limited time period is a time period selected by the member from a list of time periods.

In some embodiments of the user device 700, a location determination system from which the location sharing module receives the location data is included. The location determination system, in some embodiments comprises a GPS (Global Positioning System) receiver. The location determination, in some embodiments, may further comprise a processor for calculating location based on data received from the GPS receiver or any other device or system that provides location data to users. In other embodiments, the location determination system is a system that calculates location based on triangulation of radio signals. Other location determination systems include GLONAS and Galileo.

In some embodiments, the user device calculates the location data. In other embodiments, it is provided by an external position broadcast system. In other embodiments, the location data is a location input by the member into the user device.

The user device 700, in some embodiments, further comprises a memory for storing data shared by the user devices of the data sharing group. In other embodiments, the user device 700 further comprises an input interface for receiving data shared by user devices of the data sharing group. The user device 700, in some implementations, further comprises a timer configured to track the limited time period. The timer can be any timing device used in electronic devices. In some embodiments it is the clock used by a processor in the user device. It is to be understood that these embodiments are not mutually exclusive and can be implemented in any combination.

Figure 8B:
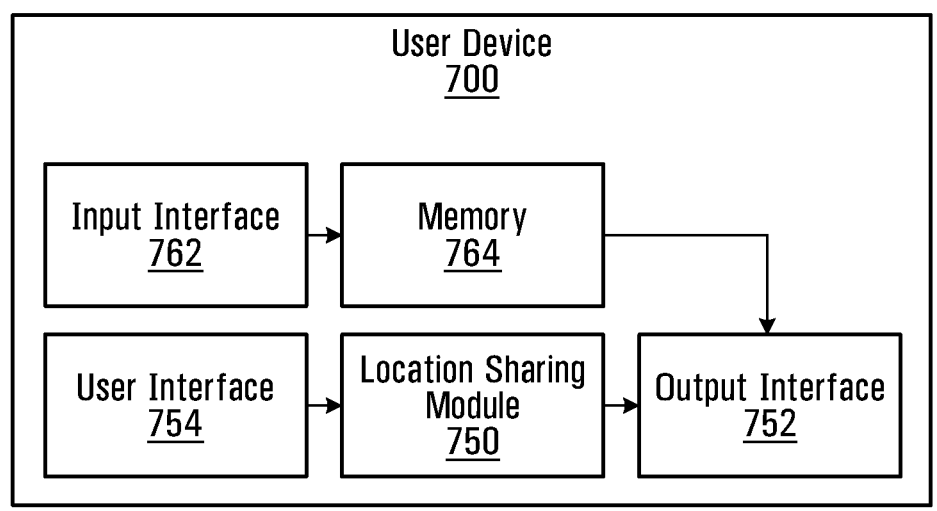
FIG. 8B is a block diagram of elements of a user device.

An exemplary embodiment of a user device is depicted in FIG. 8B. In this embodiment, a user device 750 comprises an input interface 762, a memory 764, a user interface 754, a location sharing module 756 and an output interface 752. The user interface 754, a location sharing module 756 and an output interface 752 are similar in function and configuration to the user interface 704, the location sharing module 706 and the output interface 702 described with reference to FIG. 8A. The input interface 762 is for receiving data from other devices in a data sharing group, such as a peer-to-peer data sharing group. The memory 764 is for storing the data received.

Figure 9:
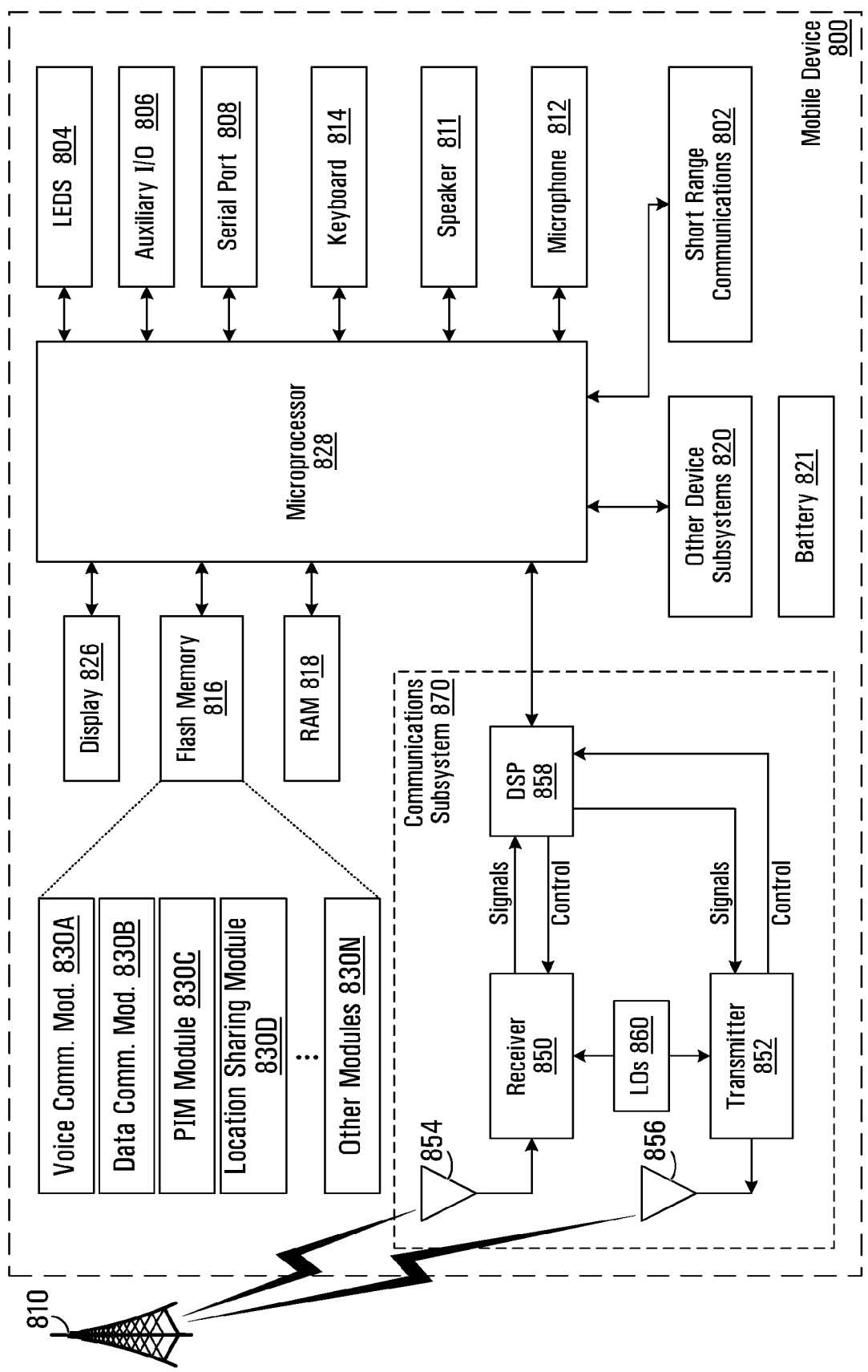
FIG. 9 is a block diagram of a mobile device on which the methods described herein may be executed.

Referring now to FIG. 9, shown is a block diagram of another mobile device 800 that may implement any of the methods described herein. It is to be understood that the mobile device 800 is shown with very specific details for example purposes only.

A processing device (a microprocessor 828) is shown schematically as coupled between a keyboard 814 and a display 826. The microprocessor 828 controls operation of the display 826, as well as overall operation of the mobile device 800, in response to actuation of keys on the keyboard 814 by a user.

The mobile device 800 has a housing that may be elongated vertically, or may take on other sizes and shapes (including clamshell housing structures). The keyboard 814 may include a mode selection key, or other hardware or software for switching between text entry and telephony entry. The keyboard 814 is an example of an implementation of the user interface 704 or 754 described with reference to FIGS. 8A and 8B.

In addition to the microprocessor 828, other parts of the mobile device 800 are shown schematically. These include: a communications subsystem 870; a short-range communications subsystem 802; the keyboard 814 and the display 826, along with other input/output devices including a set of LEDS 804, a set of auxiliary I/O devices 806, a serial port 808, a speaker 811 and a microphone 812; as well as memory devices including a flash memory 816 and a Random Access Memory (RAM) 818; and various other device subsystems 820. The mobile device 800 may have a battery 821 to power the active elements of the mobile device 800. The mobile device 800 is in some embodiments a two-way radio frequency (RF) communication device having voice and data communication capabilities. In addition, the mobile device 800 in some embodiments has the capability to communicate with other computer systems via the Internet.

Operating system software executed by the microprocessor 828 is in some embodiments stored in a persistent store, such as the flash memory 816, but may be stored in other types of memory devices, such as a read only memory (ROM) or similar storage element. In addition, system software, specific device applications, or parts thereof, may be temporarily loaded into a volatile store, such as the RAM 818. Communication signals received by the mobile device 800 may also be stored to the RAM 818.

The microprocessor 828, in addition to its operating system functions, enables execution of software applications on the mobile device 800. A predetermined set of software applications that control basic device operations, such as a voice communications module 830A and a data communications module 830B, may be installed on the mobile device 800 during manufacture. In addition, a personal information manager (PIM) application module 830C may also be installed on the mobile device 800 during manufacture. The PIM application is in some embodiments capable of organizing and managing data items, such as e-mail, calendar events, voice mails, appointments, and task items. The PIM application is also in some embodiments capable of sending and receiving data items via a wireless network 810. In some embodiments, the data items managed by the PIM application are seamlessly integrated, synchronized and updated via the wireless network 810 with the device user's corresponding data items stored or associated with a host computer system.

In addition, a software application to perform a location sharing function 830D may be installed. The location sharing function 830D may implement any of the methods described herein for limiting a time for which location data sharing is enabled for a user device of a peer-to-peer data sharing group. The location sharing function 830D is an exemplary implementation of location sharing modules 706 and 750 described with reference to FIGS. A and B.

As well, additional software modules, illustrated as another software module 830N, may be installed during manufacture.

Communication functions, including data and voice communications, are performed through the communication subsystem 870, and possibly through the short-range communications subsystem 802. The communication subsystem 870 includes a receiver 850, a transmitter 852 and one or more antennas, illustrated as a receive antenna 854 and a transmit antenna 856. The transmitter 852 and transmit antenna 854 are an exemplary implementation of the output interfaces 702 and 752 described with reference to FIGS. 8A and 8B. In addition, the communication subsystem 870 also includes a processing module, such as a digital signal processor (DSP) 858, and local oscillators (LOs) 860. The specific design and implementation of the communication subsystem 870 is dependent upon the communication network in which the mobile device 800 is intended to operate. For example, the communication subsystem 870 of the mobile device 800 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 800.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 800 may send and receive communication signals over the communication network 810. Signals received from the communication network 810 by the receive antenna 854 are routed to the receiver 850, which provides for signal amplification, frequency down conversion, filtering, channel selection, etc., and may also provide analog to digital conversion. Analog-to-digital conversion of the received signal allows the DSP 858 to perform more complex communication functions, such as demodulation and decoding. In a similar manner, signals to be transmitted to the network 810 are processed (e.g., modulated and encoded) by the DSP 858 and are then provided to the transmitter 852 for digital to analog conversion, frequency up conversion, filtering, amplification and transmission to the communication network 810 (or networks) via the transmit antenna 856.

In addition to processing communication signals, the DSP 858 provides for control of the receiver 850 and the transmitter 852. For example, gains applied to communication signals in the receiver 850 and the transmitter 852 may be adaptively controlled through automatic gain control algorithms implemented in the DSP 858.

In a data communication mode, a received signal, such as a text message or web page download, is processed by the communication subsystem 870 and is input to the microprocessor 828. The received signal is then further processed by the microprocessor 828 for an output to the display 826, or alternatively to some other auxiliary I/O devices 806. A device user may also compose data items, such as e-mail messages, using the keyboard 814 and/or some other auxiliary I/O device 806, such as a touchpad, a rocker switch, a thumb-wheel, or some other type of input device. The composed data items may then be transmitted over the communication network 810 via the communication subsystem 870.

In a voice communication mode, overall operation of the device is substantially similar to the data communication mode, except that received signals are output to a speaker 811, and signals for transmission are generated by a microphone 812. Alternative voice or audio I/O subsystems, such as a voice message recording subsystem, may also be implemented on the device 800. In addition, the display 826 may also be utilized in voice communication mode, for example, to display the identity of a calling party, the duration of a voice call, or other voice call related information.

The short-range communications subsystem 802 enables communication between the mobile device 800 and other proximate systems or devices, which need not necessarily be similar devices. For example, the short-range communications subsystem may include an infrared device and associated circuits and components, or a Bluetooth™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. A user device comprising:
an output interface for transmitting data to a plurality of other user devices of a peer-to-peer data sharing group, the data sharing group comprising at least two user devices other than the user device, each user device of the data sharing group configured to store data shared by user devices of the data sharing group on the respective user device and to maintain a list of the user devices in the data sharing group, wherein the data stored by each user device of the data sharing group enables access to location data for other user devices of the data sharing group without contacting a server;
a user interface, configured to receive an instruction to enable periodic location data sharing of location data for the user device for a limited length of time after which location sharing is to be disabled; and
a location sharing module configured to:
during the limited length of time, periodically provide location data for the user device to the output interface to be transmitted to the plurality of other user devices of the data sharing group; and
outside the limited length of time, cease to periodically provide location data for the user device to the output interface,
wherein periodically providing location data for the user device to the output interface comprises:
periodically sending a single message to a relay or router for independent distribution to the plurality of other user devices of the data sharing group without the location data being retained by a server, the single message containing the location data and addresses of the plurality of other user devices of the data sharing group, wherein the user device subsequently receives from the relay or router a delivery acknowledgment when each of the plurality of other user devices of the data sharing group receives the single message.

2. The user device according to claim 1, further comprising a memory for storing data shared by the user devices of the data sharing group.

3. The user device according to claim 1, further comprising an input interface for receiving data shared by the user devices of the data sharing group.

4. The user device according to claim 1, wherein location sharing module is configured to commence providing the location data for the user device to the output interface upon receipt of the instruction.

5. The user device according to claim 1, further comprising a location determination system from which the location sharing module receives the location data.

6. The user device according to claim 5, wherein the location determination system comprises a GPS (Global Positioning System) receiver.

7. The user device according to claim 1, wherein the location sharing module is further configured to instruct a location determination system to turn off after the limited length of time.

8. The user device according to claim 1, further comprising a timer configured to track the limited length of time.

9. The user device according to claim 1, wherein the user device is a mobile device.

10. A method for limiting a time for which location data sharing is enabled for a user device of a peer-to-peer data sharing group, the data sharing group comprising at least two user devices other than the user device, each user device of the data sharing group configured to store data shared by user devices of the data sharing group on the respective user device and to maintain a list of the user devices in the data sharing group, wherein the data stored by each user device of the data sharing group enables access to location data for other user devices of the data sharing group without contacting a server, the method comprising:
   receiving an instruction through a user interface on the user device indicating that periodic location data sharing of location data for the user device is to be enabled for a limited length of time after which location sharing is to be disabled;
   during the limited length of time:
   periodically obtaining location data for the user device; and
   periodically transmitting the location data to a plurality of other user devices of the sharing group; and
   outside the limited length of time, cease periodically transmitting the location data,
   wherein periodically transmitting the location data to the plurality of other user devices of the sharing group comprises:
      periodically sending a single message to a relay or router for independent distribution to the plurality of other user devices of the data sharing group without the location data being retained by a server, the single message containing the location data and addresses of the plurality of other user devices of the data sharing group, wherein the user device subsequently receives from the relay or router a delivery acknowledgment when each of the plurality of other user devices of the data sharing group receives the single message.

11. The method according to claim 10, wherein obtaining location data for the user device comprises receiving a current location from GPS data in the user device.

12. The method according to claim 10, further comprising turning off a GPS receiver in the user device after the limited length of time expires.

13. The method according to claim 10, further comprising creating a notification indicating that the location data sharing has been disabled after the limited length of time expires.

14. The method according to claim 10, further comprising enabling periodic location sharing according to a pre-established schedule of subsequent lengths of time after the limited length of time expires.

15. A non-transitory computer readable medium having computer executable instructions stored thereon, that when executed cause a processor to implement a method for limiting a time for which location data sharing for a user device of a peer-to-peer data sharing group is enabled, the data sharing group comprising at least two user devices other than the user device, each user device of the data sharing group configured to store data shared by user devices of the data sharing group on the respective user device and to maintain a list of the user devices in the data sharing group, wherein the data stored by each user device of the data sharing group enables access to location data for other user devices of the data sharing group without contacting a server, and the method comprising:
   receiving an instruction indicating that periodic location data sharing of location data for the user device is to be enabled for a limited length of time after which location sharing is to be disabled;
   periodically obtaining location data for the user device; and
   instructing an output interface to:
   during the limited length of time, periodically transmit the location data to a plurality of other user devices of the data sharing group; and
   outside the limited length of time, cease to periodically transmit the location data,
   wherein periodically transmitting the location data to the plurality of other user devices of the data sharing group comprises:
      periodically sending a single message to a relay or router for independent distribution to the plurality of other user devices of the data sharing group without the location data being retained by a server, the single message containing the location data and addresses of the plurality of other user devices of the data sharing group, wherein the user device subsequently receives from the relay or router a delivery acknowledgment when each of the plurality of other user devices of the data sharing group receives the single message.

16. The non-transitory computer readable medium of claim 15, wherein the method further comprises presenting options on a user interface for selecting lengths of time for the limited length of time.

17. The non-transitory computer readable medium of claim 16, wherein the options include one or more lengths of time starting from a present time.

18. The non-transitory computer readable medium of claim 16, wherein the options include one or more recurring lengths of time.

19. The non-transitory computer readable medium of claim 16, wherein the method further comprises presenting options in the form of a calendar, from which the user can select one or more lengths of time for the limited length of time.

20. The non-transitory computer readable medium of claim 15, wherein the location data is obtained from GPS (Global Positioning System) data.

* * * * *